United States Patent Office 3,135,406
Patented June 2, 1964

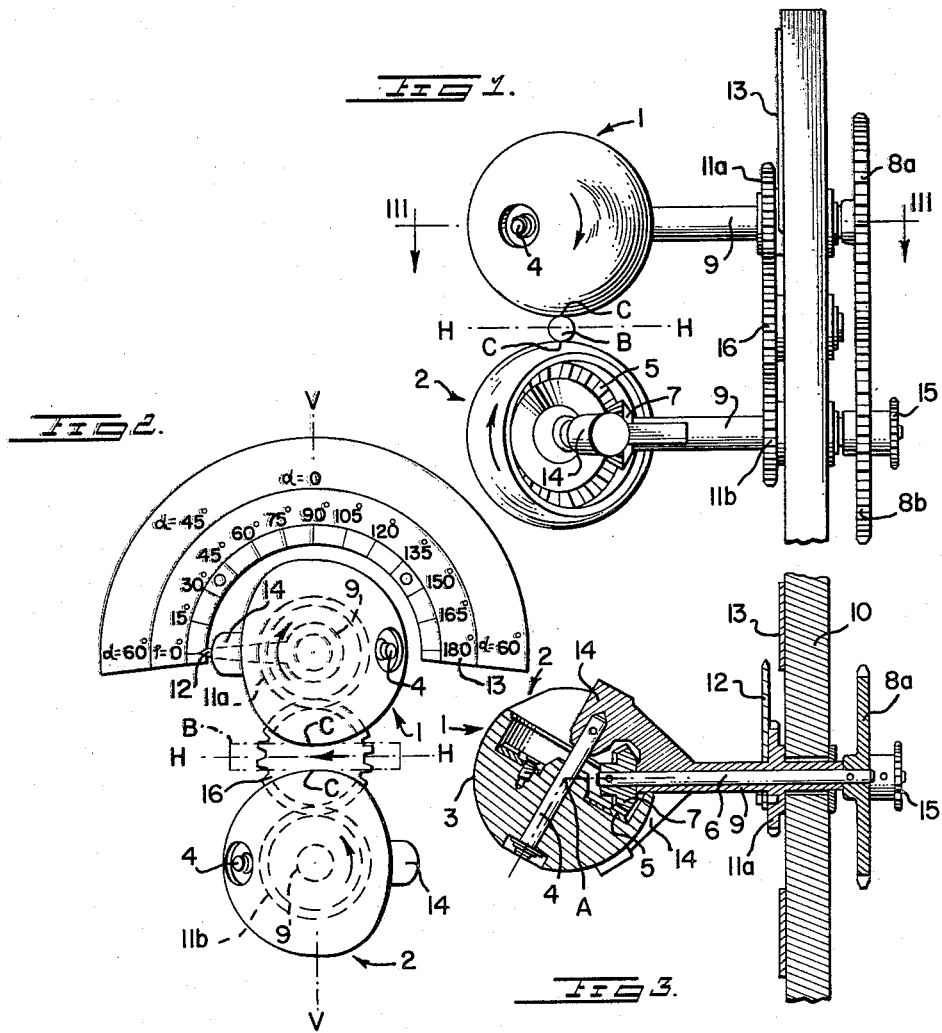

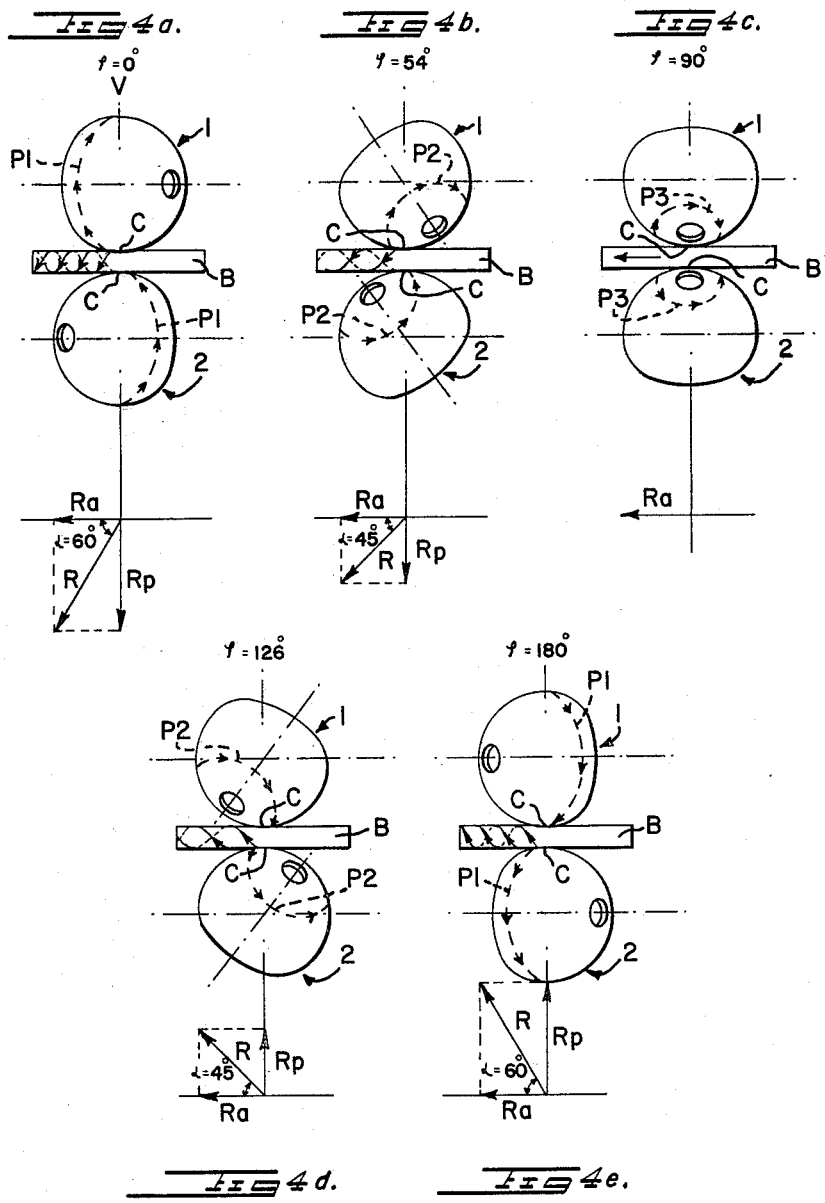

3,135,406
MACHINE FOR CONVEYING ROD-SHAPED OBJECTS
Åke R. Skärström, Spanga, Sweden, assignor to Arenco Aktiebolag, Vallingby, Sweden, a Swedish joint-stock company
Filed Oct. 1, 1962, Ser. No. 227,223
Claims priority, application Sweden Oct. 11, 1961
2 Claims. (Cl. 214—339)

This invention relates to a machine for the axial conveying of rod-shaped objects, for example, cigar bunches, during simultaneous axial rotation by means of two rolls journalled on opposite sides of the conveying path of the objects.

An object of the invention is to provide an improved machine in which the velocity of axial rotation is adjustable to zero independent of the conveying velocity in an axial direction. A machine of this kind is specially suitable to effect the twisting of the spirally wound strip of tobacco enclosing a string of cigar bunches as disclosed in the British patent specification 856,082.

According to the invention there is provided a machine for axially conveying rod shaped objects, with rolls having spherical driving surfaces, rotatably mounted each on a regulating shaft, which shafts are mounted each on a rotatably mounted adjusting shaft forming a predetermined angle with the regulating shaft and such that the center of the roll coincides with the center axis of the adjusting shaft, the two adjusting shafts being located in parallel with each other in a plane perpendicular to the conveying direction and mutually connected so that the two planes containing the center axes of the regulating and adjusting shafts are parallel or coinciding and so that the center axes of the regulating shafts cross or intersect each other, respectively.

A specific embodiment of the invention designed to convey cigar bunches is shown by way of example in the accompanying drawings in which:

FIGURE 1 is a vertical side view of the machine in a plane perpendicular to the conveying direction;

FIGURE 2 is an end view of the machine in FIGURE 1;

FIGURE 3 is a horizontal sectional view along the line III—III of FIGURE 1 showing the upper conveying roll and its driving and adjusting means as well as a portion of the contour of the lower conveying roll;

FIGURES 4a to 4e are schematic end views and corresponding velocity triangles illustrating five different modes of motion regulated by the adjustment of the conveying rolls. The velocity triangles relate to the upper roll.

The machine according to the invention is provided with two conveying rolls 1 and 2 having outer driving surfaces 3 consisting of a ring segment of a sphere. The roll 1 is rotatably journalled on a shaft 4 hereinafter referred to as the "regulating shaft." A toothed ring 5 coaxial to the shaft 4 and secured to the roll 1 meshes with a bevel gear 7 secured to a driving shaft 6. The gear 5 may alternately be fixedly mounted on the shaft 4 in which case the roll 1 is secured to this shaft. A gear 8a is secured to the driving shaft 6, which is rotatably journalled in a tubular roll adjusting shaft 9 which in turn is rotatably journalled on a fixedly mounted vertical plate 10 and which is formed in one piece with a gear 11a. A pointer 12 is mounted on the gear 11a in front of an angle graduated scale 13 mounted on the plate 10. The end portion of the shaft 4 protruding from the roll 1 is secured to a finger 14 on the tubular shaft 9. The lengthened center line of the driving shaft 6 intersects the center axis of the regulating shaft 4 in the center A of the sphere at a suitable angle, for instance 60°.

In the horizontal view as shown in FIGURE 3 the rolls 1 and 2 are symmetrical in relation to the plane V—V containing the center axes of the driving shafts 6. The roll 2 consists of exactly the same details as the roll 1. The gear 8b is secured to the driving shaft 6 of this roll and meshes with and has the same diameter as the gear 8a. A gear 11b is secured to the tubular adjusting shaft 9 of the roll 2. The gears 11a and 11b are equal and mesh with an intermediate freely rotatably journalled gear 16. At the outer end of the driving shaft 6 of the roll 2 there is a sprocket 15 co-operating with a sprocket-chain, not shown.

If assumed that the pointer 12, according to FIGURE 2, points to the zero position, that is $\varphi=0°$, the rolls 1 and 2 are positioned as shown in FIGURES 1-3 and 4a, the regulating shafts 4 of the rolls being parallel with the horizontal center plane H—H situated intermediate the rolls and containing the center line of the bunches and the rolls 1 and 2 as well as the fingers 14 form reflected images of each other in relation to the vertical plane V—V containing the center axes of the driving shafts 6. The shafts 4 cross each other in this case and form equal angles $\alpha=60°$ to the vertical plane V—V. The direction of the resultant, R, composed by the peripherical and the axial motion $R_p$ and $R_a$, respectively, corresponds to the "pitch angle" $\alpha=60°$. On the spherical driving surfaces of the rolls 1 and 2 circles P, concentric to the regulating shafts 4 are formed by the points which successively pass the points of contact C of the rolls 1, 2 and the bunch B. The planes of these circles form angles of 60° with the vertical plane V—V in the position shown in FIGURE 4a.

If the sprocket and the shafts 9 are turned so that the pointer 12 points to the angular position $\varphi=54°$ the rolls are changed to the position shown in FIGURE 4b in which case the component of motion $R_p$ tangential to the bunch B decreases but the component of motion $R_a$ in axial direction remains constant and the pitch angle becomes equal to $\alpha=45°$, that is, the bunch is rotated slower but the conveying velocity is constant. The points passing the points of contact C of the rolls and the bunch form the circular paths $P_2$, which in conformity to the paths $P_1$ in FIGURE 4a are to be considered narrow, oblique disc rolls for conveying and turning of the bunches. According to above the tangents of the circles $P_2$ in the points C form angles of 45° with the vertical plane V—V. The distance between the points C on the drive surfaces 3 is not influenced by changing the angle $\varphi$ but is constant all the time. The tangent circles of the two rolls are mutually equal in any position of the rolls 1 and 2 effected by turning the shafts 9 and the planes of the circles have equal obliquity and are facing mutually opposite directions. The tangent circles $P_1$ are bigger than the circles $P_2$ and the velocity R of the points of tangency C is greater in the setting according to FIGURE 4a than in the setting according to FIGURE 4b but due to different angles of obliquity the axial component of motion $R_a$ becomes constant and the tangential component of motion $R_p$ becomes smaller in FIGURE 4b than in FIGURE 4a.

When the shafts 9 are turned to the position in which the pointer 12 points to $\varphi=90°$ the rolls 1 and 2, according to FIGURE 4c, are positioned on opposite sides of the horizontal centre plane H—H in positions which are mutually symmetrical. In this position the tangents of the contact circles $P_3$ in the points of contact C are parallel with the path of motion of the bunches B, that is $\alpha=0°$. Consequently the bunch is not rotated. The circle $P_3$ is so much smaller than the circles $P_1$ and $P_2$ that the axial component of motion $R_a$ remains constant. Hence the conveying velocity $R_a$ of the bunches is unvarying.

When the pointer 12 is adjusted to point to the position $\varphi=126°$ the rolls 1 and 2 are positioned as shown in FIGURE 4d in which position the contact circles $P_2$ form reflected images of the circles shown in FIGURE 4b. The bunch is rotated with the same velocity as in the case according to FIGURE 4b but the direction of rotation is inversed whereas the direction and magnitude of the axial component of motion $R_a$ remain constant.

According to FIGURE 4e it follows that when the pointer 12 is adjusted to point to $\varphi=180°$ the reflected images of the contact circles $P_1$ in FIGURE 4a are achieved, that is, the bunch is rotated with the same velocity but the direction of rotation is inversed whereas the direction and magnitude of the axial component of motion $R_a$ remain constant.

From this description it will appear that it is possible to adjust the machine to obtain different velocities of rotation and reversal of the direction of rotation as desired without influencing the velocity of conveying. Hence this machine is specially suitable for use in accession to the machine for turning and conveying a wound string of axially conveyed bunches according to the British patent specification No. 856,082 by means of which twisting of the wound strip of tobacco intermediate consecutive bunches can be varied as desired.

The machine described above may be varied in different ways without departure from the scope of invention and may also be used in package machines.

What I claim is:

1. A machine for the axial conveying of rod-shaped objects such as cigar bunches comprising two rolls journalled on opposite sides of the conveying path of said objects, spherical driving surfaces on said rolls, a regulating shaft for each roll on which each roll is rotatably mounted, a rotatably mounted adjusting shaft on which each regulating shaft is mounted forming a predetermined angle with its corresponding regulating shaft so that the center axis of said adjusting shaft coincides with the center of its corresponding roll, said two adjusting shafts being mounted parallel to each other in a plane perpendicular to the conveying direction of said objects, and means mutually connecting said adjusting shafts in proper relationship so that the plane containing the center axes of said regulating and adjusting shafts of one of said rolls and the plane containing the center axes of said regulating and adjusting shafts of the other roll are parallel, and the center axes of said regulating shafts cross each other.

2. A machine as claimed in claim 1 wherein said adjusting shafts each comprise a tubular shaft, a driving shaft within said tubular shaft and a bevel drive driven by said driving shaft for driving its corresponding roll.

No references cited.